(12) United States Patent
Tucker et al.

(10) Patent No.: US 11,411,756 B2
(45) Date of Patent: Aug. 9, 2022

(54) SYSTEM AND METHOD FOR PROVIDING SECURE CLOUD-BASED ACCESS AND CONTROL OF CLOUD BASED CONTENT SOURCES TO COMMUNITY DEVICES VIA FEDERATED AUTHORIZATION AND PERSONAL DEVICES

(71) Applicant: Polycom, Inc., San Jose, CA (US)

(72) Inventors: Mike Tucker, Austin, TX (US); Eric Hyman, Austin, TX (US); Dragan Ignjatic, Belgrade (RS)

(73) Assignee: POLYCOM, INC., San Jose, CA (US)

( * ) Notice: Subject to any disclaimer, the term of this patent is extended or adjusted under 35 U.S.C. 154(b) by 190 days.

(21) Appl. No.: 15/997,247

(22) Filed: Jun. 4, 2018

(65) Prior Publication Data

US 2018/0351755 A1 Dec. 6, 2018

Related U.S. Application Data

(60) Provisional application No. 62/515,814, filed on Jun. 6, 2017.

(51) Int. Cl.
| | |
|---|---|
| *H04L 12/18* | (2006.01) |
| *G06F 3/14* | (2006.01) |
| *H04L 67/1097* | (2022.01) |
| *H04L 67/10* | (2022.01) |
| *H04L 67/131* | (2022.01) |

(52) U.S. Cl.
CPC ........ *H04L 12/1813* (2013.01); *G06F 3/1454* (2013.01); *H04L 12/1827* (2013.01); *H04L 67/10* (2013.01); *H04L 67/1097* (2013.01); *H04L 67/38* (2013.01); *G09G 2370/022* (2013.01); *G09G 2370/027* (2013.01)

(58) Field of Classification Search
CPC ............. H04L 12/1813; G06F 3/1454; G09G 2370/022
USPC ......................................................... 709/204
See application file for complete search history.

(56) References Cited

U.S. PATENT DOCUMENTS

2015/0310188 A1* 10/2015 Ford ...................... G06F 21/10
726/28
2016/0044071 A1* 2/2016 Sandholm ............. H04L 65/403
709/204

OTHER PUBLICATIONS

Hewlett, Thin Client vs Thick Client Architecture, richhewlett.com, 10 pages (Year: 2008).*

* cited by examiner

*Primary Examiner* — Wing F Chan
*Assistant Examiner* — Leon Y Tseng

(57) ABSTRACT

Content is shared by rendering the content in a shared session and providing the rendered content to the participating devices. The originating device has access to an original version of the content in a virtual session, which is accessed by logging into cloud content services and downloading the desired content into the virtual session. A rendering engine in a rendered session then renders the content and distributes the rendered content to the participants. Only rendered content is provided to the participants, so that the participants cannot see the credentials of the originating user, cannot see the document source and do not have access to the document itself. The participants can mark up the rendered content, which markups are shared to the other participants.

18 Claims, 4 Drawing Sheets

SYSTEM AND METHOD FOR PROVIDING SECURE CLOUD-BASED ACCESS AND CONTROL OF CLOUD BASED CONTENT SOURCES TO COMMUNITY DEVICES VIA FEDERATED AUTHORIZATION AND PERSONAL DEVICES

CROSS-REFERENCE TO RELATED APPLICATIONS

This application claims priority to U.S. Provisional Application No. 62/515,814, filed Jun. 6, 2017, the contents of which are entirely incorporated by reference herein.

BACKGROUND

Today, many devices provide access to cloud-based services and content sources. In order to access these sources, identity and credential information must be entered directly on these devices, which provides uncontrolled access to a user's content. In turn, these devices then have complete access to the user's account information and therefore have the ability to access and store copies of the user's content. Users in a collaboration session may want to present documents resident in a cloud-based service but there are often concerns about simply providing the documents to other users. One example is when a user in a collaboration session wants to show a document to other participants but does not want them to: 1) have direct access to the document, 2) have the ability to edit or modify the document, 3) store the document and 4) give their viewing device any access to the authentication credentials for the document source. In some situations, the user showing the document may want to give other participants the ability to edit the document, but no ability to obtain and store the document.

SUMMARY

Embodiments according to the present invention share content by rendering the content in a shared session and providing the rendered content to the participating devices. The originating device has access to an original version of the content in a virtual session, which is accessed by logging into cloud content services and downloading the desired content into the virtual session. A rendering engine in a rendered session then renders the content and distributes the rendered content to the participants. Only rendered content is provided to the participants, so that the participants cannot see the credentials of the originating user, cannot see the document source and do not have access to the document itself. The participants can mark up the rendered content, which markups are shared to the other participants.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Embodiments according to the present invention enable a user to securely share content to participants in a virtual collaboration session across trust boundaries. The embodiments also enable a user to securely share content to a community device, for example in a public conference room, without requiring the user to enter, or share, authentication credentials on that community device.

Figure 1:
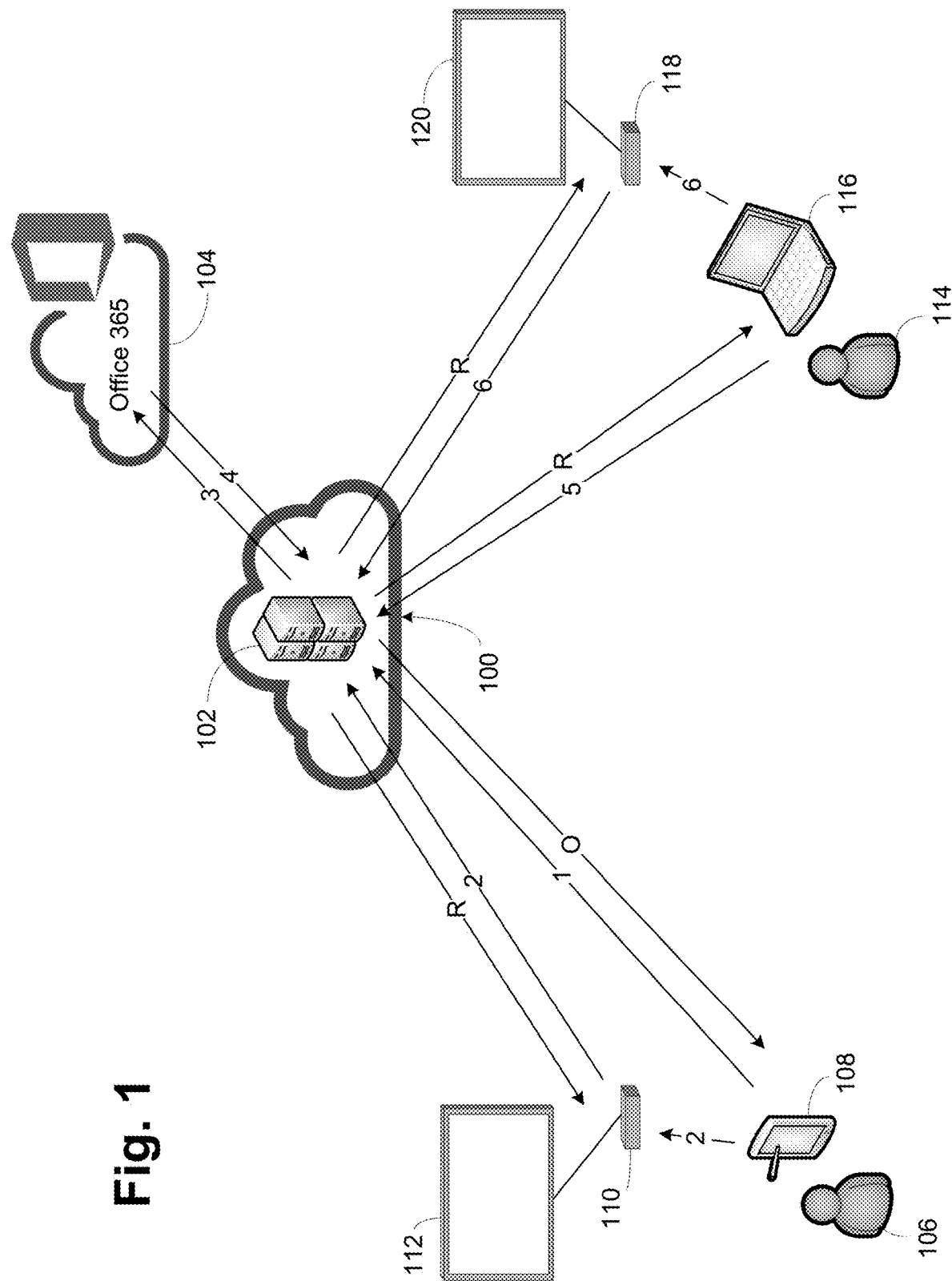
FIG. 1 is a block diagram and operational flow of embodiments according to the present invention.

Embodiments according to the present invention provide a meeting cloud service 100, such as a remoter service 102 of FIG. 1, that provides federated access to the user's content via one or more services, such as Microsoft® OneDrive®, Office 365® 104, Box®, Active Directory Federation Services (AD FS), etc. These services are linked to the meeting cloud service 100 by the enterprise that is using the meeting cloud service 100.

Referring to FIG. 1, various users and devices are present in a collaboration session. A user 106 in a first conference room uses a device such a tablet 108 to participate in the collaboration session. A first community device 110, which is a computer-based collaboration appliance, is connected to a monitor 112, preferably a large format monitor for use in the first conference room. The first community device no is referred to as a "community" device as it is located in a conference room allocated to the meeting, which is thus a community area. The first community device 110 participates in the collaboration session to provide a view to other users in the first conference room. A second user 114 in a second conference room uses a laptop computer 116 in the collaboration session. A second community device 118 is connected to a second monitor 120 in the second conference room.

Figure 2:
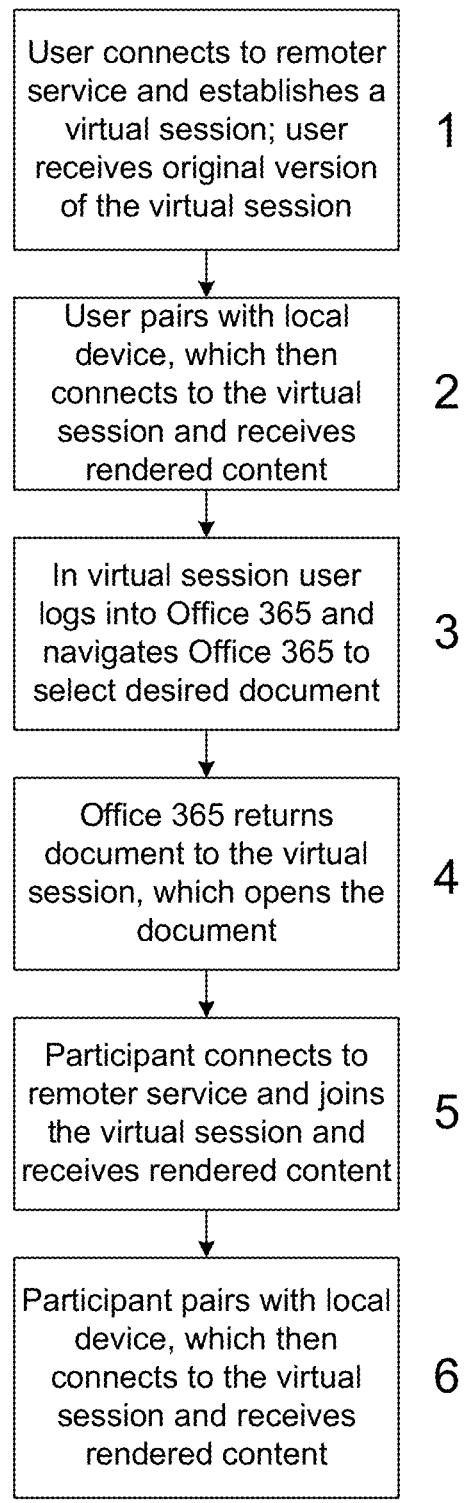
FIG. 2 is a flowchart of the operations of FIG. 1.

Referring to FIGS. 1 and 2, to establish a meeting or collaboration session the user 106 uses the tablet 108 to contact the remoter service 102 in operation 1. The remoter service 102 establishes a virtual session. As the originator of the virtual session, the user 106 receives the original version of the virtual session, as shown by the arrow from the remoter service 102 to the tablet 108 with the O annotation. The original version is a version where the user can access and control the virtual session as if it were executing on the tablet 108. In operation 2 the user 106 pairs the tablet 108 with the first community device 110. When the tablet 108 is paired, the first community device 110 receives information from the tablet 108 to allow the first community device 110 to join the virtual session and connects to the remoter service 102 to join the virtual session. When the remoter service 102 joins the first community device 110 to the virtual session, any virtual session content is rendered to the first community device 110. Rendering is only performed on content loaded into the virtual session. The original version access by the tablet 108 is not rendered and is only accessible to the user 106 via the tablet 108 which originated the virtual session. In rendering, the remoter service 102 accesses any content present in the virtual session securely using user-provided credentials, and then renders that content using a rendering engine. This rendering engine develops still image bitmaps, video, html, and/or other methods known to those skilled in the art. This rendering is then sent to one or more of the devices in the virtual session for presentation to users in the meeting, in this first case the first community device 110, as shown by the arrow from the remoter service 102 to the first community device 110 with an R annotation. Presentation includes display of content, playing of audio content, or both. The presentation may include some form of digital watermarking to provide traceability. The rendering engine provides increased security because the various participants merely have access to a rendering of the user's content. They do not have access to the user's credentials, direct access to the content itself, or even knowledge of which cloud service is hosting user content. In this first moment, there is no content as the user 106 has not obtained any content, so the rendered image is blank.

After the tablet 108 is paired with the first community device 110, in operation 3 the user 106 accesses the Office 365 104 service via the original version and authenticates to gain access to the Office 365 104 service. As there is no content, any collaboration session participants do not see the service being accessed or the credentials used to access the service. The user 106 navigates in the Office 365 104 service to find the desired content for the collaboration session and selects the document or other content item. In operation 4 the content item is downloaded by the remoter service 102, a rendered session is started and the content is provided to the rendering engine in the rendered session. When the content is rendered, the rendered version is provided to all participants of the collaboration session, it being understood that the user 106 accesses the original version of the content in the virtual session.

In operation 5, user 114 connects to the remoter service 102 using the laptop computer 116 and, after being authorized, is placed into the virtual session and receives rendered content as shown by the arrow from the remoter service 102 to the laptop computer 118 with the R annotation. In operation 6 the laptop computer 116 pairs with the second community device 118, which then connects to the remoter service 102 and is joined to the virtual session and receives rendered content. It is understood that instead of connecting directly in operation 5, the user 114 could just use the laptop computer 116 and pair with the second community device 118 to have the rendered content displayed on the monitor 120.

Figure 3:
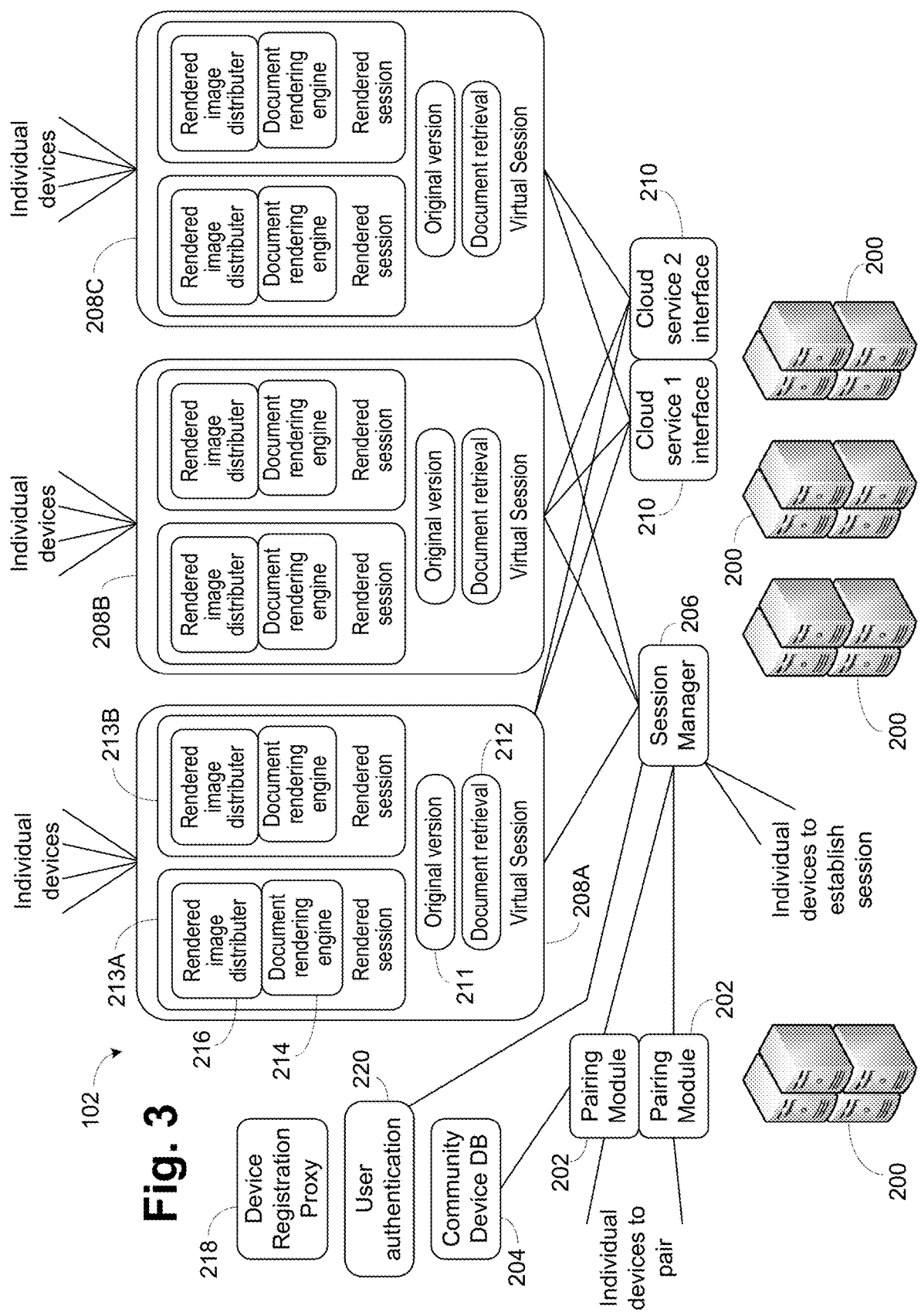
FIG. 3 is a block diagram of the remoter service of FIG. 1.

FIG. 3 provides details on the logical configuration of the remoter service 102. The remoter service 102 is a cloud-based application service on cloud-based servers, such as servers 200 shown in FIG. 3, increasing and decreasing instances as needed. The illustrated software modules can execute in virtual machines, containers or natively, as desired. There can be multiple instances of each module and management software for the various instances and communication with that management software are not shown for simplicity.

Pairing modules 202 connected to a community device database 204 provide the pairing and location functions related to the community devices as discussed herein. The pairing modules 202 and the individual devices, such as the tablet 108 and laptop 116, connect to a session manager 206, which manages the various aspects of the virtual sessions. The pairing modules 202 contact the session manager 206 to allow the paired devices, such as the community devices 110 and 118, to be in the same virtual session as the individual devices. Similarly, the individual devices contact the session manager 206 to authenticate and then either initiate a new virtual session or join an existing virtual session. The session manager 206 opens virtual sessions 208A-208C as requested by the individual devices, one virtual session 208A-208C per collaboration session. The session manger 206 provides a token for the respective virtual session 208A-208C to the individual devices to allow the individual devices to access the virtual session.

Present are cloud service interfaces 210. Each cloud service interface 210 cooperates with a designated cloud service, such as Office 365 104, Box, Dropbox, OneDrive and the like. By having dedicated cloud service interfaces 210, the functions do not need to be duplicated in each session, but if desired the cloud service interfaces 210 can be opened in each virtual session 208A-208C.

As noted, a virtual session 208A-208C is established for each collaboration session. An original session 211 is present for use by the originating device as discussed above. Each virtual session 208A-208C includes a document retrieval module 212 to cooperate with the cloud service interface 210 to obtain the desired document or content. A rendered session 213A, 213B is developed in a virtual session 208A-208C for each content item. The obtained document or content is provided to a document rendering engine 214 in the rendered session 213A, 213B. The rendering engine 214 opens the obtained document or content and develops a rendered version of the document or content in a buffer in the rendered session 213A, 213B. A rendered image distributor module 216 in each rendered session 213A, 213B provides a copy of the rendered image or rendered content to each individual device and community device participating in the collaboration session. The rendered image distributor module 216 is functionally equivalent to sharing programs such as VNC® and the like. The rendered image distributor module 216 also receives any inputs provided by the individual devices or community devices to perform edits, markups, comments and the like to the rendered image for all individual devices and community devices to observe.

Both the community devices and the individual devices under the control of the users in the collaboration session are registered via a centralized device proxy module 218. Users may be authenticated by a user authentication module 220 cooperating with the session manager 206 through a device under their control, such as their personal computer or tablet. The user authentication module 220 may operate through a federated identity service linked to the remoter service 102 or by a native authentication service deployed as part of this meeting cloud service 100. Note that some of these users might not be part of the enterprise that is using the service, and the identity service might be a third-party service that is not part of the enterprise's trust domain.

In some cases, a user might have one or more community devices nearby. Typically, this occurs when they are in a conference room with a community device. The user pairs his own personal device to such a community device to establish proximity, as indicated in operations 2 and 5 of FIG. 1. Such pairing is done using beacons, ultrasonic means, near field communication, or other means. Then the user connects these community devices to the virtual session after establishing a virtual session directly, as shown in operations 3 and 6 of FIG. 1, or it may happen automatically according to policies established in the remoter service 102. It is noted that the user only authenticates with his personal device, not the community device, and the remoter service 102 gives the community device access to the virtual session, and the content, due to the pairing, the community device having been previously authorized when installed. When the community device is installed, in addition to obtaining the authentication credentials, information such as physical location, associated equipment and the like is entered into the community device database 204.

In other cases, a user might be already using a community device that is part of the virtual session. In this case, the user may use pairing to simplify the connection of his own device to the virtual session, the community device requesting access from the session manager 206 and providing the access information to the user's personal device.

One aspect of embodiments according to the present invention is that the devices are being connected to a virtual session of the cloud meeting service 100 or remoter service 102 itself, and not simply being paired together.

The cloud meeting service 100 can use its knowledge of device proximity in the management of the meeting experience. For instance, content can be displayed on a community device with a UHD display, and not displayed on other devices in the session that are in the same location. This knowledge can be based on configuration of location information, knowledge of the pairing used to establish proximity, or other means.

The cloud meeting service 100 can similarly use its knowledge of user proximity. For instance, if users Alice and Bob both establish proximity with the same community device, then they are in the same location. The cloud service 100 may use this information in a number of ways, for example to display a roster of participants grouped by their location. This knowledge may be learned in other ways. Alice's device may establish proximity directly with Bob's device. Biometrics in Bob's device might also recognize that Alice is in proximity.

In some of the embodiments selected session participants receive the ability to edit the document, by sending their editing commands to the rendered document without providing those participants access to the document source.

Once the user chooses to stop sharing a given document, all participants in the virtual session lose access to the rendered version from the rendered session 213A, 213B as the rendered session 213A, 213B and its associated rendering engine 214 and rendered image distributor 216 is closed and no trace of the user's content is left on the participating devices.

Figure 4:
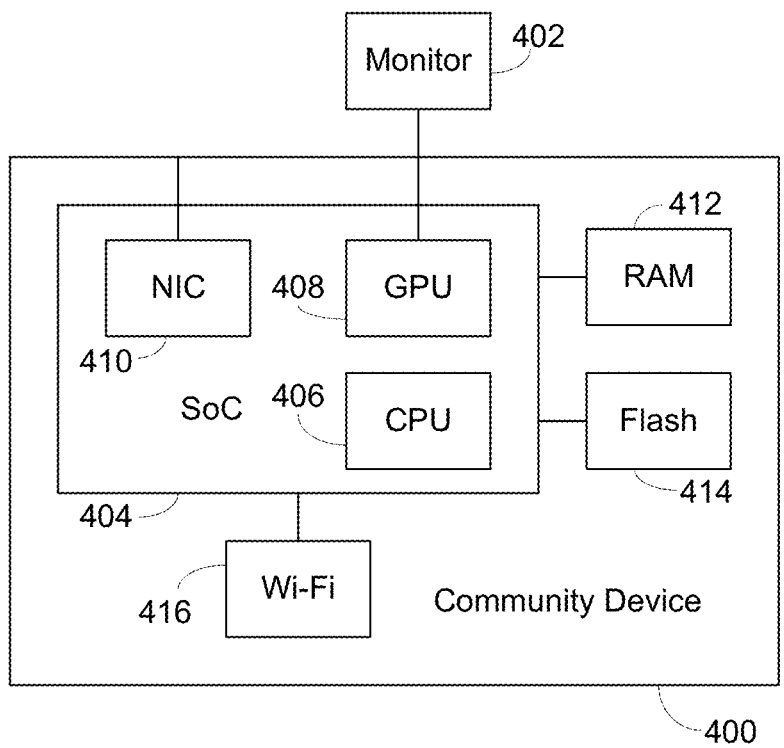
FIG. 4 is a block diagram of a community device of FIG. 1.

FIG. 4 is an exemplary block diagram of a community device 400 connected to a monitor 402. A system on a chip (SoC) 404 is the primary component in the community device 400. The SoC 404 includes a CPU 406, a GPU 408 and a network interface 410. Flash memory 414 is connected to the SoC 404 to provide program and operating system storage for the community device 400. RAM 412 is connected to the SoC 404 to provide working memory for the CPU 406. A Wi-Fi® module 416 is provided to allow a user tablet, phone or laptop to be able to pair with the community device 400 and provide the ability to project the device screen onto the monitor 402. It is understood that this is an exemplary block diagram and many other configurations would be suitable.

Figure 5:
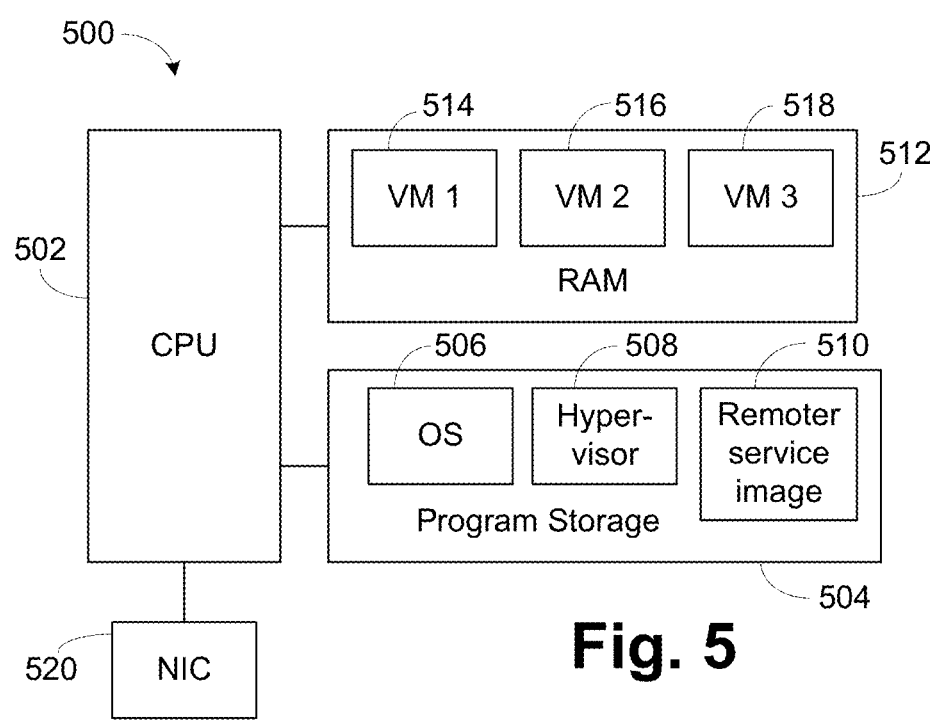
FIG. 5 is a block diagram of a server operating the remoter service.

FIG. 5 is a block diagram of an exemplary server 500 present in the cloud environment. A CPU 502 provides the processing component and is connected to program storage 504. The program storage 504 includes an operating system 506, a hypervisor 508 and a remoter service image 510. The remoter service image 510 contains programs that when executed on the CPU 502 perform the various operations of the remoter service. RAM 512 is connected to the CPU 502 and contains the various virtual machines 514, 516 and 518 that are executing on the server 500, with one of the virtual machines 514, 516, 518 executing the remoter service image 510 to provide a remoter service 102. A network interface 520 is provided for connectivity. It is understood that this is a simplified block diagram of a server provided for explanatory purposes and may other configurations of a server could be used.

As discussed, by rendering the document or content in a cloud-based session, participants are able to review the document or content but do not obtain a copy of the document or content or access to the cloud service.

It is also noted that this content sharing may be a single aspect of a broader collaboration session, with normal audio and video conferencing occurring in parallel. In preferred embodiments, a single application handles both the conferencing and the content sharing as described here, to simplify user operations. The audio/video conferencing software and hardware have not been illustrated for simplicity.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for sharing a content item with devices engaged in a real time collaboration session, wherein each of the devices in the real time collaboration session are one of individual devices and common, shared devices, and wherein a first individual device pairs with a second common, shared device or a first common, shared device pairs with a second individual device, the method comprising the steps of:

initiating a real time collaboration session upon receipt of a request from an originating device;

joining additional devices to the real time collaboration session upon receipt of requests from the additional devices while the originating device is in the real time collaboration session;

when one of the first individual device or the first common, shared device is in the real time collaboration session as an additional device, joining the second common, shared device or the second individual device to the real time collaboration session as an additional device after pairing with the first individual device or the first common, shared device;

obtaining a copy of a content item upon receipt of a request from the originating device during the real time collaboration session;

providing the copy of the content item to a cloud-based rendered session;

rendering the content item in the cloud-based rendered session; and providing a copy of the rendered content item by the cloud-based rendered session to each of the additional devices in the real time collaboration session.

2. The method of claim 1, wherein the content item is stored in a cloud-based storage service, and the method further comprises the step of accessing the cloud-based storage service which maintains the content item, and wherein the step of obtaining a copy of the content item includes obtaining a selected content item from the cloud-based storage service.

3. The method of claim 1, wherein the content item may comprise one of a document, an audio file or a video file.

4. The method of claim 1, wherein there are a plurality of content items and wherein the rendering and providing a copy of the rendered content item steps are separately performed in a different cloud-based rendered session for each different content item.

5. The method of claim 1, further comprising the step of opening a virtual session when the real time collaboration session is requested by the originating device, and
    wherein the obtaining a copy of the content item and providing the copy of the content item steps are performed in an original session in the virtual session.

6. The method of claim 5, wherein there are a plurality of content items and wherein the rendering and providing a copy of the rendered content item steps are separately performed in a different cloud-based rendered session for each different content item, and
    wherein all such different cloud-based rendered sessions are performed in the virtual session.

7. The method of claim 5, wherein the content item is stored in a cloud-based storage service, and
    the method further comprises the steps of:
    accessing the cloud-based storage service from the virtual session; and
    starting a rendered session when the content item is to be obtained,
    wherein the rendering and providing a copy of the rendered content item steps are performed in the rendered session that was started.

8. The method of claim 7, wherein the original session is available only to the originating device requesting the real time collaboration session.

9. The method of claim 1, wherein a copy of rendered content is provided only to a common, shared device paired with an individual device and not to the paired individual device as an exception to providing a copy of the rendered content item by the cloud-based rendered session to each of the additional devices in the real time collaboration session.

10. A non-transitory program storage device comprising instructions to cause one or more processors to perform a method for sharing a content item with devices engaged in a real time collaboration session, wherein each of the devices in the real time collaboration session are one of individual devices and common, shared devices, and wherein a first individual device pairs with a second common, shared device or a first common, shared device pairs with a second individual device, the method comprising the steps of:
    initiating a real time collaboration session upon receipt of a request from an originating device;
    joining additional devices to the real time collaboration session upon receipt of requests from the additional devices while the originating device is in the real time collaboration session;
    when one of the first individual device or the first common, shared device is in the real time collaboration session as an additional device, joining the second common, shared device or the second individual device to the real time collaboration session as an additional device after pairing with the first individual device or the first common, shared device;
    obtaining a copy of a content item upon receipt of a request from the originating device during the real time collaboration session;
    providing the copy of the content item to a cloud-based rendered session;
    rendering the content item in the cloud-based rendered session; and
    providing a copy of the rendered content item by the cloud-based rendered session to each of the additional devices in the real time collaboration session.

11. The non-transitory program storage device of claim 10, wherein the content item is stored in a cloud-based storage service, and
    the method further comprises the step of accessing the cloud-based storage service which maintains the content item, and
    wherein the step of obtaining a copy of the content item includes obtaining a selected content item from the cloud-based storage service.

12. The non-transitory program storage device of claim 10, wherein the content item may comprise one of a document, an audio file or a video file.

13. The non-transitory program storage device of claim 10, wherein there are a plurality of content items and wherein the rendering and providing a copy of the rendered content item steps are separately performed in a different cloud-based rendered session for each different content item.

14. The non-transitory program storage device of claim 10, the method further comprising the step of opening a virtual session when the real time collaboration session is requested by the originating device, and
    wherein the obtaining a copy of the content item and providing the copy of the content item, are performed in an original session in the virtual session.

15. The non-transitory program storage device of claim 14, wherein there are a plurality of content items and wherein the rendering and providing a copy of the rendered content item steps are separately performed in a different cloud-based rendered session for each different content item, and
    wherein all such different cloud-based rendered sessions are performed in the virtual session.

16. The non-transitory program storage device of claim 14, wherein the content item is stored in a cloud-based storage service, and
    the method further comprises the steps of:
    accessing the cloud-based storage service from the virtual session; and
    starting a rendered session when the content item is to be obtained,
    wherein the rendering and providing a copy of the rendered content item steps are performed in the rendered session that was started.

17. The non-transitory program storage device of claim 16, wherein the original session is available only to the originating device requesting the real time collaboration session.

18. The non-transitory program storage device of claim 10, wherein a copy of rendered content is provided only to a common, shared device paired with an individual device and not to the paired individual device as an exception to providing a copy of the rendered content item by the cloud-based rendered session to each of the additional devices in the real time collaboration session.

\* \* \* \* \*